United States Patent [19]
McClellan

[11] 3,848,897
[45] Nov. 19, 1974

[54] THERMAL SHIELD

[76] Inventor: William McClellan, 151 N. Autumn, San Jose, Calif. 95110

[22] Filed: Dec. 26, 1973

[21] Appl. No.: 427,920

[52] U.S. Cl. .................. 285/47, 52/219, 52/303, 248/56, 285/64, 285/158, 285/351, 285/373, 285/DIG. 19, 285/DIG. 24
[51] Int. Cl. ................................................ F16l 59/14
[58] Field of Search ........... 285/46, 47, 64, 61, 205, 285/215, 216, 351, 373, 419, 192, 302, 423, 55, 158, DIG. 19, DIG. 24; 126/148; 138/147, 149, 151, 161; 248/56; 52/219, 220, 303

[56] References Cited
UNITED STATES PATENTS

| | | | |
|---|---|---|---|
| 248,442 | 10/1881 | Fowler | 138/147 X |
| 569,123 | 10/1896 | Norton | 285/192 X |
| 2,857,931 | 10/1958 | Lawton | 138/149 X |
| 3,058,759 | 10/1962 | Mc Duff | 248/56 X |
| 3,206,228 | 9/1965 | Burrell | 285/47 |
| 3,542,402 | 11/1970 | Caples et al. | 285/423 X |
| 3,563,503 | 2/1971 | Lancaster | 138/149 X |
| 3,776,579 | 12/1973 | Gale | 285/373 X |

Primary Examiner—Jordan Franklin
Assistant Examiner—Moshe I. Cohen
Attorney, Agent, or Firm—Bruce & McCoy

[57] ABSTRACT

A thermal shielding device for an insulated fixture running through a wall comprised of an insulating cylindrical member surrounding the fixture, two telescoping tubular members disposed in the wall and surrounding the cylindrical member, and two asbestos rope rings for spacing the insulating cylindrical member within telescoping tubular members.

10 Claims, 4 Drawing Figures

PATENTED NOV 19 1974  3,848,897

THERMAL SHIELD

FIELD OF THE INVENTION

The present invention relates to thermal shields and more particularly to a thermal shield for mounting an insulated fixture running through a wall.

BACKGROUND OF INVENTION

Structural fires account for tremendous losses of both property and human life. Of major concern in building design therefore, is that materials and fixtures be used which will prevent a fire or at least confine it to its point or origin and which at the same time are economically feasible. To this end, building codes generally require that various fire retardant materials and fixtures be used depending on the type of structure to be erected and its intended use.

A major problem in connection with the confinement of structural fires arises because fixtures such as water or air conditioning pipes necessarily run through walls separating adjoining rooms. Wherever a fixture passes through a wall a void between the wall and the fixture is created. Superheated air and flamable can blow through this void igniting flammable materials in the adjacent room and creating danger of suffocation to persons in or passing through the spaces adjacent to the fire area.

It is the usual practice to run a fixture through a wall and then fill or pack the void in the wall surrounding the fixture with fire retardant materials such as fiberglass or mineral wool. However, these commonly used packing materials suffer from a serious disadvantage in that they contain resins which melt at approximately 470°F. The intense heat of a fire exceeds this temperature. As the resins melt away, the remaining fibers are simply blown out of the hole by the overpressure developed on the fire side of the wall. In the case of noninsulated pipes this problem can substantially be eliminated by stuffing the void with asbestos rope. However, asbestos rope tends to crumble, or break up, with any slight shifting movement of the fixture in the wall. Such movements of a fixture are common and are caused by such influences as thermal expansions and contractions in the building structural members or by foundational movements due to settling or earthquakes.

The present invention is concerned with mounting insulated fixtures, especially pipes, through walls as opposed to noninsulated fixtures. The insulated pipe through a wall presents an added fire hazard since standard insulated pipes use fiberglass as an insulating material. The fiberglass surrounds the pipe and is, in turn, usually wrapped with a vapor barrier jacket such as aluminum foil. Using prior art methods, the insulated pipe, is mounted in a wall in the same manner as the noninsulated pipe, that is, by running the pipe through the wall and packing the void between the wall and the pipe with one of the above mentioned insulating materials. If a fire starts on either side of the wall, the fiberglass insulating material which surrounds standard insulated pipes as well as the packing material, breaks down in the manner described above, and both are blown out of the wall by the overpressure created by the fire. Standard insulated pipes thus provide yet one additional component which can break down under intense heat. Unlike uninsulated pipes, this problem cannot be overcome by simply packing the void between the insulated pipe jacket and the wall with asbestos since the insulation around the pipe itself will break down and dislodge leaving a void between the asbestos rope and the pipe without its insulation In fact, without the support of the pipe insulation, the asbestos may tend to break up and also become dislodged.

The present invention overcomes this problem in the existing art by providing a device for mounting a standard insulated fixture in a wall such that a fire seal is created which can withstand high temperatures and air pressures. The device will not transfer heat either by conduction or convection from the fire side of a wall to adjacent areas.

Another advantage the present invention provides over prior art devices is that it provides a good acoustical barrier at those points where insulated fixtures run through walls. Present devices and techniques for filling the void created by a fixture running a wall allow acoustical vibrations to penetrate the wall such that sounds generated in one room can travel to the adjacent room through whatever packing material is used between the pipe and the wall. The present invention, however, has been shown to provide a good acoustical seal.

A further advantage of the present invention over prior art is that various easily assembled units can be made which fit the various standard insulated pipe sizes. Each unit could be simply and cheaply manufactured; its assembly would require no special tools, but could be done mostly by hand in a short period of time.

The invention possesses other features of advantage, some of which, with the foregoing, will be apparent from the following description and the drawings.

SUMMARY OF THE INVENTION

The present invention is a thermal shield for a fixture running through a wall. It includes a pair of rigid mating insulators which closely surround the fixture. The mating insulators are held in place by a pair of metal shields which closely surround the insulators. These metal shields include one shield which circumscribes more than 180° of the external surface of the mating insulators and overlaps longitudinal edge portions of the smaller complimentary shield. The pair of metal shields are held in captured relation with respect to each other by sliding the larger shield along the axis of the fixture onto the longitudinal edge portions of the smaller shield. A pair of neoprene coated asbestos ropes surround the pair of metal shields proximate the opposite ends thereof. The present invention also includes a pair of elongated hollow members disposed in, and attached at their respective ends to, opposite sides of the wall through which the fixture passes. The pair of hollow members surround the cylindrical element composed of the mating insulators and the metal shields, which cylindrical element, in turn, surrounds the fixture. The asbestos rope space the cylindrical element within the hollow members and form a fire seal therebetween.

OBJECTS OF THE INVENTION

It is therefore an important object of the present invention to provide a thermal shield for a fixture running through a wall which will prevent a fire on one side of the wall from spreading to the oposite side of the wall through the hole accommodating the fixture.

It is another object of the present invention to provide a thermal shield which seals the hole in the wall through which a fixture runs to prevent smoke and superheated air, caused by a fire, from passing therethrough.

It is a further object of the present invention to provide a thermal shield which is easily assembled without the necessity of special tools.

It is yet another object of the present invention to provide a thermal shield which does not conduct heat from the fire side of a wall to the other side of the wall.

And it is still a further object of the present invention to provide a thermal shield which insulates the pipe from the wall.

DESCRIPTION OF THE PREFERRED EMBODIMENT

Figure 1:
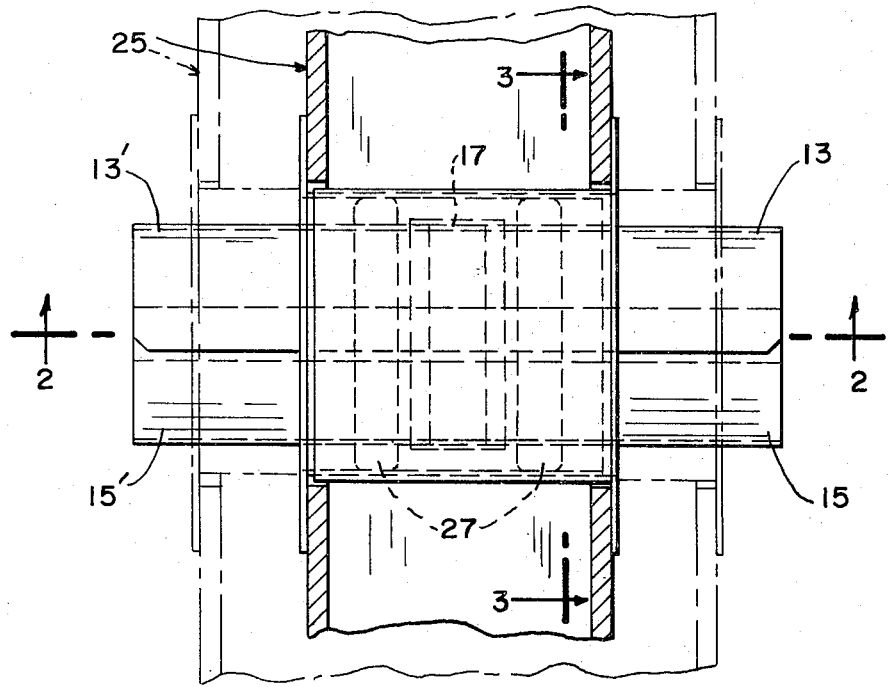
FIG. 1 is a side elevational view showing the thermal shield affixed to two walls of different thicknesses.
Figure 2:
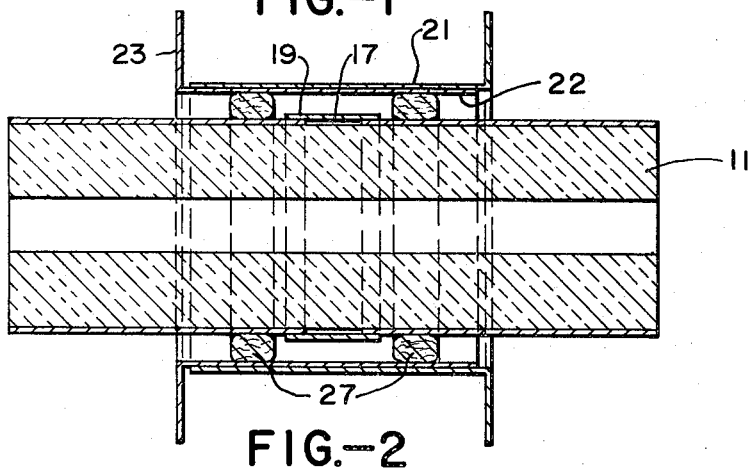
FIG. 2 is a sectional view taken along 2—2 of FIG. 1.
Figure 3:
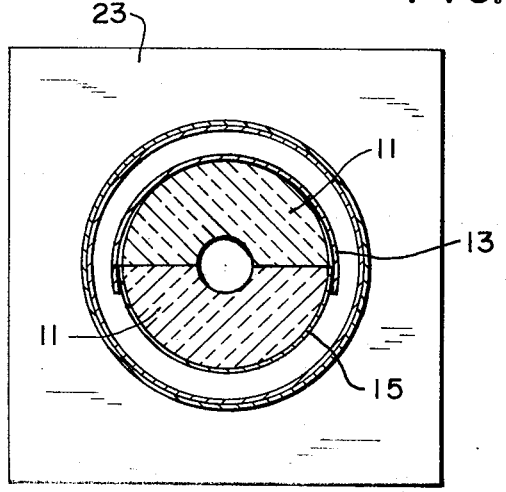
FIG. 3 is a sectional view taken along 3—3 of FIG. 1.
Figure 4:
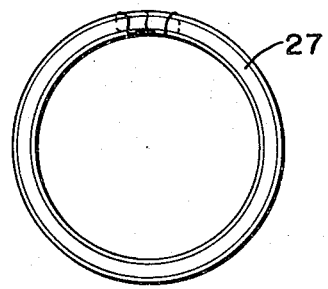
FIG. 4 is an end elevational view.

The present invention is a thermal shield for preventing superheated air and smoke caused by a fire from spreading to a contiguous room along a fixture, normally a pipe, running through a wall. It includes a pair of rigid mating insulators (11) which closely surround the fixture passing through the wall. The insulators are fabricated so that two half sections can easily be positioned in a mating relation around the fixture with the axial cavity formed by the two insulators being shaped to closely fit around the fixture. In the preferred embodiment, the insulators are fabricated from calcium silicate and mate to form a cylinder with a cylindrical bore for surrounding a portion of insulated pipe running through a wall. Such portion of pipe has its normal insulation removed to accommodate the mating insulators of the present invention. The outside diameter of the cylinder formed by mating the pair of insulators (11) is chosen to correspond to the outside diameter of the insulation surrounding the portion of the insulated pipe not mounted in the wall such that the cylinder surrounding the pipe in the wall will conform to the remaining pipe insulation surrounding the pipe outside the wall. Of course, other rigid insulating materials may be substituted in place of calcium silicate and other axial bore configurations can be utilized to accommodate different shaped pipes or fixtures.

Also in the preferred embodiment, the calcium silicate insulators are given a waterproofing treatment to prevent moisture from turning the calcium silicate into a soft, mushy material. The presence of moisture may be due to the sweating of the pipe or, in the case of a pipe mounted through an outside wall, adverse weather conditions. It has been found that the ingredients best suited for this treatment is a mixture of 17 parts of Shell super VMSP Naphtha to 2½ parts of Dow Corning 773 Silicone.

A pair of metal shields (13) and (15) closely surround the external surfaces of the mating insulators (11) and hold the insulators in mating relation around the fixture. Each shield only partially circumscribes the periphery of the mating insulators and, therefore, has longitudinal edges parallel to the axis of the fixture. The pair of shields are not secured by external means, but are held in captured relation with respect to each other by sliding the larger second shield (13) along the axis of the fixture over the longitudinal edge portions of the smaller first shield (15). The first shield (15) partially circumscribes the periphery of the mating insulators (11) as does the second shield (13) and the two shields taken together circumscribe more than the entire periphery resulting in an overlap at both of the shield's longitudinal edges. To slide the second shield onto the first the shields are first positioned end to end, and then, while deflecting the second shields metal longitudinal edges slightly outward, the second is urged onto the first. The restoring force of the second metal shield contributes to holding the pair in captured relation around the mating insulators.

Normally, the pair of metal shields (13) and (15) would be arcuate in shape to conform to the outer surface of a cylindrical insulator. However, they may take on other shapes as, for example, a rectangular shape. In the preferred embodiment the pair of shields are arcuate with the first shield (15) closely circumscribing 180° of the outer periphery of a rigid cylinder comprised of the two mating semi-cylindrical insulator halves (11). The second of the pair of shields (13) circumscribes the remaining 180° of the cylinder's outer periphery plus longitudinal edge portions of the first shield such that the second shield holds the first shield in captured relation. The pair of arcuate shields (13) and (15) and the mating insulators (11) form a cylindrical elment which is assembled by simply holding the first shield (15) in place against the outer surface of one of the insulator halves and axially sliding the larger second arcuate shield (13) which is placed against the other insulator half onto the edges of the first shield. Alternatively, the insulator halves (11) could first be placed in mating relation around the pipe with the first arcuate shield (15) firmly placed against the outer surface of the mating insulators. The second shield (13) is then positioned on the first shield by sliding it along the axis and over the outer surface of the mating insulators onto longitudinal edge portions of the first arcuate shield. The cylindrical element resulting from such an assembly surrounds a portion of the insulated fixture extending through and roughly 2 inches from each side of the wall from which portion the pipe insulation has been removed. The cylindrical element will normally abut the pipe insulation forming a joint around which vapor barrier tape can be wrapped.

Also in the preferred embodiment, the pair of shields (13) and (15) are sectioned, or split, in the middle to form a second pair of shields (13') and (15'). The resulting two pair of shields are disposed at opposite ends of the mating insulators (11) forming a gap (17) between them and are each placed into captured relation in the same manner described in the case of the single pair of arcuate metal shields except that two, instead of one, pair of shields have to be assembled.

The gap (17) formed by sectioning the one pair of shields into two pairs of shields thermally insulates one end of the cylindrical element from the other by preventing longitudinal heat flow by conduction. In the preferred embodiment, the gap (17) is covered by thermally non-conductive, vapor barrier tape (19) which adheres to the surfaces of the two pair of metal shields (13) and (15) and (13') and (15'), respectively, immediately adjacent to the gap and to the exposed surface of the mating insulators. The function of the tape is to provide a vapor barrier around the gap created by sectioning the pair of metal shields. Vapor is caused by the sweating of pipes which are colder than the surrounding atmosphere. It is therefore only important that vapor barrier tape be used on a device used in connection with pipes which pass cold fluids.

The present invention further includes two telescoping elongated hollow members (21) and (22) which are disposed in the wall through which the fixture runs. A flange (23) is affixed to one end of each of the hollow members for securing the hollow members, respectively, to opposite sides of the wall (25). Because of their telescoping construction, the members may be adpated to fit walls of varying thicknesses as shown in FIG. 1. Even if the wall has a thickness greater than the combined length of the hollow members positioned end to end whereby the members are not in telescoping relation, the device will still function properly. Although flanges are used in the preferred embodiment, any means of securing the hollow members to each side of the wall may be employed.

In the preferred embodiment the two elongated hollow members (21) and (22) have slightly different diameter circular cross-sections for a sliding fit, thus forming a pair of telescoping tubular members. These tubular members are disposed in and secured to the wall (25) to provide a shielded hole through which the fixture, closely surrounded by the cylindrical element passes. The hollow members, however, could have other than a circular cross-sectional shape to more easily accommodate the shape of whatever fixture is passing through the wall.

A pair of asbestos rope rings (27) closely surrounds the outer surfaces of the two pair of metal shields (13) and (15) and (—') and (15'), respectively, proximate the ends of the shields. The rope rings also snugly, but slidingly, engage the inner surface of the elongated hollow members (21) and (22) and serve to space the mating insulators (11) and closely surrounding shields (13) and (15) and (13') and (15'), respectively, within the telescoping hollow members in the wall (25). The ropes ring can be formed from single pieces of asbestos rope of approximate equal length which are wired together at their abutting ends and can be coated with any material adequate for preventing crumbling of the asbestos.

In the preferred embodiment the asbestos rope rings (27) are coated with neoprene to prevent the asbestos from flaking, crumbling, or breaking up and are disposed around the respective pairs of metal shields (13) and (15) and (13') and (15'), respectively, and approximately 1 inch inside the respective ends of the telescoping tubular members (21) and (22). The combination of the cylindrical element through which the fixture runs and the surrounding neoprene coated asbestos ropes (27) snugly fits into the telescoping tubular members (21) and (22) disposed in the wall by urging the assembly into the tubular members over the outer diameter of the ropes. The ropes space the cylindrical element within the tubular members; they also form snug fit therebetween such that superheated air or smoke is prevented from passing through the wall between the cylindrical element and the tubular members, but whereby the cylindrical element is allowed to axially slide within the tubular members to compensate for slight axial movements due to thermal expansions and contractions or foundational movements of the structure carrying the fixture.

The present invention is a very novel device for supporting a pipe or other fixture passing through a wall and is effective in preventing fires from spreading through walls at the point where the pipe passes through the wall. At the same time the device is economical to fabricate and easy to assemble while providing a rigid and durable construction.

While the present invention has been described in specific terms, it should not be limited to the terms used except as may be necessitated by the appended claims.

I claim:

1. A thermal shield surrounding a fixture running through a hole in a wall, said thermal shield comprising a pair of rigid mating insulators forming a cylinder closely surrounding said fixture,
   a pair of metal shields encasing said insulators, the first of said shields partially circumscribing the external surface of said mating insulators, said first of said shields provided with longitudinal edge portions, and the second of said shields circumscribing both the external surface of said insulators not circumscribed by the first of said shields and the longitudinal edge portions of said first shield so that said first shield is captured by said second shield and the pair of said shields in combination extend completely around and closely surround the external surface of said insulators holding them in mating relation, said shields being placed into captured relation by sliding the second of said shields onto the longitudinal edge portions of the first of said shields in a direction generally parallel to the fixture,
   a pair of asbestos ropes surrounding said shields in sealing relation at opposite ends thereof, said ropes being coated with a protective material to prevent the asbestos from flaking and crumbling, and
   a pair of elongated flanged tubular members disposed in the hole in the wall through which the fixture passes, said tubular members surrounding said fixture, said shields, and said insulators, the flanges of said tubular members being attached to opposite sides of the wall respectively, and said tubular members sealingly and slidingly engaging with the respective ropes disposed around the opposite ends of said shields.

2. The thermal shield according to claim 1 wherein said metal shields are sectioned to form two separate pair of shields spaced apart to form a gap therebetween, each of said pair of shields closely surrounding said insulators at opposite ends thereof.

3. The thermal shield according to claim 2 wherein said gap is covered by thermally vapor barrier tape to provide a vapor barrier around said gap.

4. A thermal shield surrounding a pipe running through a hole in a wall comprising a pair of rigid semi-cylindrical mating calcium silicate insulators forming a cylinder with an axial cavity which in turn closely surrounds the pipe,
   a pair of arcuate metal shields closely surrounding the external surfaces of said insulators, the first of said shields circumscribing a major portion of the outer periphery of one of said insulators said first shield having longitudinal edges and the second of said shields circumscribing more than that portion of the cylindrical surface not circumscribed by the first of said shields, the second of said arcuate metal shields overlapping the longitudinal edges of the first of said shields and gripping the first arcuate metal shield in captured relation at the overlapping surfaces, a pair of neoprene coated asbestos rope rings disposed around and proximate to the opposite ends of the cylindrical element formed by the assembly of the insulators and shields, a pair of flanged telescoping tubular members disposed in the hole in the wall having the flanges mounted on and sealed to opposite sides of the wall, respectively, said tubular members concentrically surrounding both the pipe passing through the wall and the cylindrical element surrounding the pipe with said rope rings spacing said cylindrical element within said tubular members and forming a sealing and aliding fit therebetween.

5. The thermal shield according to claim 4, wherein said arcuate metal shields are sectioned to form two pairs of shields each closely circumscribing the external surface of said mating insulators, said two pair of shields being disposed at the opposite ends of said insulator and spaced apart such that one pair does not abut the other pair forming a gap therebetween which thermally insulates one end of the metal shields from the other, and each of said asbestos rope rings being disposed around the one of the pair of shields proximate the outer ends thereof but within the tubular member.

6. The thermal shield according to claim 5, wherein a strip of vapor barrier tape surrounds the gap together with a portion of each pair of metal shields adjacent to the gap, said tape adhering to outer surface of said metal shields and the exposed portion of the mating insulators to maintain a vapor barrier around said gap.

7. The thermal shield according to claim 6 wherein the pipe surrounded by the said cylindrical element comprised of said insulators and said shields is firmly supported within and generally along the axis of said telescoping tubular members by said asbestos rope rings whereby the tubular members and their respective flanges are thermally insulated from the cylindrical element and smoke and superheated air cannot pass through the hole in the wall through which the pipe passes as a result of the seals created between the pipe and the wall by the thermal shield.

8. The thermal shield according to claim 4 wherein said pair of mating calcium silicate insulators are treated with a waterproofing substance whereby moisture will not break down the calcium silicate.

9. A thermal shield surrounding a pipe running through a hole in a wall comprising a pair of rigid semi-cylindrical mating calcium silicate insulators forming a cylinder with an axial cavity closely surrounding the pipe, said mating insulators being treated with a waterproofing substance, two pairs of arcuate metal shields closely circumscribing the external surface of said insulators and disposed at opposite ends of said insulator to form a gap therebetween, the first shield of each pair of said shields circumscribing one half of the outer periphery of said insulators said first shield having longitudinal edges and the second shield of each pair of said shields circumscribing more than one half of the outer periphery of said insulators and overlapping the longitudinal edge portions of the first shield of each pair of said shields in captured relation thereto, said pairs of shields being placed into captured relation by sliding the second shield of said pairs of shields generally parallel to the axis of said pipe onto the longitudinal edge portions of the first shield of said pairs of shields, a strip of vapor barrier tape surrounding said gap between said shields together with a portion of each pair of metal shields adjacent to said gap, said tape adhering to the external surface of said metal shields and the exposed surface of said insulators to maintain a vapor barrier around said gap, a pair of neoprene coated asbestos rope rings disposed around the respective pair of shields and proximate to the opposite ends of the cylindrical element formed by the assembly of the insulators and shields, a pair of flanged telescoping tubular members disposed in the hole in the wall, said flanges being mounted on opposite sides of the wall, respectively, and said tubular members concentrically surrounding the pipe passing through the wall, the cylindrical element surrounding the pipe, and the rope rings surrounding the cylindrical element, said rope rings spacing said cylindrical element within said tubular members and forming a snug, sealing and sliding contact therebetween.

10. The thermal shield of claim 9 wherein the waterproofing substance comprises 17 parts Shell Super VMSP Naphtha to 2½ parts Dow Corning 773 Silicone.

* * * * *

UNITED STATES PATENT OFFICE
CERTIFICATE OF CORRECTION

Patent No. 3,848,897    Dated November 19, 1974

Inventor(s) William McClellan

It is certified that error appears in the above-identified patent and that said Letters Patent are hereby corrected as shown below:

IN THE SPECIFICATION

Column 1, line 14 "or" should be --of--

Column 1, line 24 "flamable" should be --smoke--

Column 2, line 66 "oposite" should be --opposite--

Column 5, lines 17 & 18 "adpated" should be --adapted--

Column 5, line 39 "(-')" should be --(13')--

IN THE CLAIMS

Signed and sealed this 1st day of April 1975.

(SEAL)
Attest:

RUTH C. MASON
Attesting Officer

C. MARSHALL DANN
Commissioner of Patents
and Trademarks